US006933324B2

(12) United States Patent
Stamires et al.

(10) Patent No.: US 6,933,324 B2
(45) Date of Patent: Aug. 23, 2005

(54) METHOD FOR PERFORMING A FISCHER-TROPSCH PROCESS USING AN IRON-CONTAINING LAYERED MATERIAL

(75) Inventors: Dennis Stamires, Newport Beach, CA (US); Marieke Paulyne Renate Spee, Utrecht (NL); Erik Jeroen Laheij, Amstelveen (NL); Paul O'Connor, Hoevelaken (NL)

(73) Assignee: Akzo Nobel N.V. (NL)

( * ) Notice: Subject to any disclaimer, the term of this patent is extended or adjusted under 35 U.S.C. 154(b) by 133 days.

(21) Appl. No.: 10/637,787

(22) Filed: Aug. 8, 2003

(65) Prior Publication Data

US 2004/0092608 A1 May 13, 2004

Related U.S. Application Data

(60) Provisional application No. 60/402,379, filed on Aug. 9, 2002.

(51) Int. Cl.[7] .............................................. C07C 27/00
(52) U.S. Cl. ........................ 518/719; 518/715; 518/718
(58) Field of Search ................................ 518/715, 718, 518/719

(56) References Cited

U.S. PATENT DOCUMENTS

| | | | | |
|---|---|---|---|---|
| 2,850,515 | A | 9/1958 | Riblett et al. ............ | 260/449.6 |
| 4,559,363 | A | 12/1985 | Miller et al. ................ | 518/711 |
| 4,665,044 | A | 5/1987 | Pinnavaia et al. ............ | 502/84 |
| 4,920,086 | A | 4/1990 | Raythatha et al. ............ | 502/63 |
| 6,077,419 | A | 6/2000 | Wittenbrink et al. ....... | 208/112 |

FOREIGN PATENT DOCUMENTS

| | | | | |
|---|---|---|---|---|
| GB | 1439769 | 6/1976 | ............ | C07C/1/04 |
| WO | WO01/26810 | 4/2001 | ............ | B01J/37/03 |
| WO | WO 02/089978 | 11/2002 | ............ | B01J/29/06 |

OTHER PUBLICATIONS

Herein, D. et al., "*On the Nature of the So-Called Iron-Graphite*", Carbon, vol. 35, No. 1, pp. 17–29, 1997.
International Search Report of corresponding PCT/EP 03/08770, dated Jan. 13, 2004.
Ann. Chim. Fr., M.P. Astier et al., "*Ammonium Triammine Tetranickel(II) Pentamolybdate*", vol. 12, 1987, pp. 337–343.
Chem. Mater, Doron Levin, et al, "*Chimie Douce Synthesis of a Layered Ammonium Zinc Molybdate,* " 1996, pp. 836–843.
Doron Levin, et al., "*Chimie Douce Synthesis of Nanostructured Layered Materials*", Chapter, 16, American Chemical Society, 1996, pp. 237–249.
Stud. Surf. Sci. Catal., vol. 18, S. Soled, et al, "*Soft Chemical Synthesis of Mixed Metal Molybdate Oxidation Catalysts and their Structural Relationship to Hydrotalcite*", 1998, pp. 359–367.

Journal of Solid State Chemistry, 128, Mai Tu, et al, "*Microcalorimetric Studies of Surface Acid/Base Properties of Magnesium–Iron Catalysts Prepared from Hydrotalcite–Type Precursors*," (1997), pp. 73–79.
Catalysis Today, 30, Jianyi Shen, et al "*Preparation and Characterization of Fe/MgO Catalysts Obtain from Hydrotalcite–Like Compounds*" (1996), pp 77–82.
Catalysis Letters, 7 Mark E. Dry, "*Fischer–Tropsch Synthesis Over Iron Catalysts*", (1990), pp. 241–252.
Thermochimica Acta 302, Mai Tu, et al, "*Preparation, Characterization and Microcalorimetric Studies of Nickel–Iron Hydrotalcites and and their Decompositions*", (1997), pp. 117–124.
Journal of Solid State Chemistry 148, Steven P. Newman, et al, "*Comparative Study of Some Layered Hydroxide Salts Containing Exchangeable Interlayer Anions*", (1999), pp. 26–40.
Reactivity of Solids, 3, K. Petrov, et al, "*Thermal Decomposition of Mixed Magnesium(II)–Cobalt(II) Hydroxide Nitrate Crystals to $Mg_xCo_{3-x}O_4(1 < x \leqq 1)$ Spinels*", (1987), pp. 67–74.
Reactivity of Solids, 1, L. Markov, et al "*Nickel–Oxide Spinels Prepared by Thermal Decompositionof Nickel(II)–Cobalt(II) Hydroxide Nitrates*", (1986), pp. 319–327.
Russian Journal of Inorganic Chemistry, Zhurnal Neoganicheskoi Khimii, 30, L. Markov, et al, "*The Preparation of Solid Solutions Based on Copper and Cobalt Hydroxide Nitrates*", (1985), pp. 3023–3026.
Journal Mater. Chem., 1991 1(4), Piero Porta, et al,"*Copper–Cobalt Hydroxysalts and Oxysalts: Bulk and Surface Characerization*", pp. 531–537.
Inorganic Chemistry, 32, Martina Meyn, et al, "*Anion–Exchange Reactions of Hydroxy Double Salts*", (1993), pp. 1209–1215.
Solid State Ionics 53–56, Shoji Yamanaka, et al, "*Anion Exchange Reactions in Layered Basic Copper Salts*", (1992), pp. 527–533.
Recent Res. Devl. In Mat. Sci. 1, Hiroyuki Morioka, et al., "*Preparation and Applicationof Inorganic Layered Compounds for Anion Exchanged Reaction*", (1998), pp. 137–188.
Abstract of Compt. Rend, 248, Jean Gauthier, "*Preparation of Some New Basic Copper Salts*", (1991), pp. 3170–3172.

*Primary Examiner*—J. Parsa
(74) *Attorney, Agent, or Firm*—Louis A. Morris

(57) ABSTRACT

A method for performing a Fischer-Tropsch process using as a catalyst (precursor) an iron-containing layered material selected from the group consisting of layered materials in which iron is present in the layered structure as divalent and/or trivalent metal (group 1), iron-doped layered materials (group 2), calcined iron-doped layered materials (group 3), and calcined layered materials in which iron is present in the layered structure as divalent metal (group 4). The term "layered material" includes anionic clays, layered hydroxy salts, cationic clays, and cationic layered materials.

3 Claims, No Drawings

METHOD FOR PERFORMING A FISCHER-TROPSCH PROCESS USING AN IRON-CONTAINING LAYERED MATERIAL

CROSS REFERENCE TO RELATED APPLICATION

This application claims priority from U.S. Provisional Patent Application No.: 60/402,379, which was filed Aug. 9, 2002.

BACKGROUND OF THE INVENTION

1. Field of the Invention

The present invention relates to a Fischer-Tropsch process using an iron-containing layered material.

2. Prior Art

As explained by M. E. Dry in *Catal. Lett.*, Vol. 7 (1990) 241–252, the most suitable catalytic metals for Fisher Tropsch synthesis, i.e. the production of hydrocarbons from CO and $H_2$, are Fe, Co, and Ru. Of these metals, iron is the least expensive and has the highest selectivity to olefins.

In order to reach a satisfactory selectivity, iron-containing catalysts require a certain level of basicity. This basicity is usually created by the addition of alkali. Unfortunately, alkali is known to migrate over the catalyst surface, enhancing iron sintering. Furthermore, alkali enhances carbon lay-down on the catalyst, leading to deactivation of the catalyst.

Apart from carbon lay-down, also sulphur poisoning might cause deactivation. Furthermore, as a result of diffusion resistance inside the iron particles, the water vapour pressures inside these particles can be relatively high, leading to sintering and/or oxidation of the inner core of the iron particles. Shen et al. disclose the use of calcined and subsequently reduced Mg—Fe anionic clay (*Catal. Today* 30 (1996) 77–82/*J. Solid State Chem.* 128 (1997) 73–79) and Ni—Fe anionic clay (*Thermochimica Acta* 302 (1997)) in a Fischer-Tropsch process.

The present invention provides a method for performing a Fischer-Tropsch process using iron-containing layered materials which is simpler than the method of Shen. It involves fewer reaction steps and/or uses a catalyst that is easier to prepare.

SUMMARY OF THE INVENTION

The method according to the invention comprises the steps of:
 a) selecting a Fischer-Tropsch catalyst precursor,
 b) optionally reducing the Fischer-Tropsch catalyst precursor to form a Fischer-Tropsch catalyst, and
 c) performing a Fischer-Tropsch synthesis using the Fischer-Tropsch catalyst precursor according to step a) or the Fischer-Tropsch catalyst according to step b),
wherein the Fischer-Tropsch catalyst precursor comprises an iron-containing layered material selected from the group consisting of layered materials in which iron is present in the layered structure as divalent and/or trivalent metal (group 1), iron-doped layered materials (group 2), calcined iron-doped layered materials (group 3), and calcined layered materials in which iron is present in the layered structure as divalent metal (group 4).

Other embodiments of the invention include details relating to compositions of and ingredients contained in the Fischer-Tropsch catalyst precursor or the Fischer-Tropsch catalyst.

DETAILED DESCRIPTION OF THE INVENTION

The term "layered material" includes anionic clays, layered hydroxy salts, cationic clays, and cationic layered materials.

Iron-containing layered materials according to group 1 include layered materials in which iron is the divalent metal or at least one of the divalent metals present in the layered structure (group 1a) and layered materials in which iron is the trivalent metal or at least one of the trivalent metals present in the layered structure (group 1b). Group 1 also includes layered materials in which iron is present as both divalent and trivalent metal.

Iron-doped layered materials according to group 2 include layered materials wherein iron or an iron-containing compound is present in or on the layered structure as an additive (or: dopant). It also includes layered materials in which iron is both present as dopant and as divalent and/or trivalent metal in the layered structure.

The term "calcined iron-doped layered materials" (group 3) refers to iron-doped layered materials according to group 2 that have been calcined. The term "calcined layered materials in which iron is present in the layered structure as divalent metal" (group 4) refers to layered materials according to group 1a that have been calcined.

Calcination of group 1a and 2 layered materials is generally performed at temperatures in the range 200–1200° C. under oxygen-containing or inert (e.g. $N_2$, Ar, He) atmosphere.

It has now been found, in contrast to the teaching of Shen et al., that iron-containing layered materials do not have to be calcined prior to use in Fischer-Tropsch synthesis, but that they can be used directly, optionally after a reduction step. The absence of a calcination step makes the process simpler and economically more attractive.

Furthermore, iron-doped layered materials (groups 2 and 3) have the additional advantage that they can be easily prepared and that the iron-content can be easily adjusted to the desired value, because they can be prepared by impregnating an existing layered material with an iron-containing compound. On the other hand, they can also be obtained by preparing the layered material in the presence of the additive. The latter method generally results in a more homogeneous distribution of the iron-containing compound throughout the layered material.

Iron-doped layered materials generally comprise 1–35 wt %, preferably 5–20 wt %, more preferably 10–15 wt % of iron, calculated as $Fe_2O_3$ and based on the weight of the iron-doped layered material.

It is further noted that, as a result of its lower valence, the iron in group 1a layered materials is easier to reduce than the iron in group 1b layered materials, thereby requiring a lower reduction temperature and/or shorter reduction time.

Anionic Clays

Anionic clays have a crystal structure consisting of positively charged layers built up of specific combinations of divalent and trivalent metal hydroxides between which there are anions and water molecules. Hydrotalcite is an example of a naturally occurring anionic clay in which the trivalent metal is aluminium, the divalent metal is magnesium, and the predominant anion is carbonate; meixnerite is an anionic clay in which the trivalent metal is aluminium, the divalent metal is magnesium, and the predominant anion is hydroxyl.

It should be noted that a variety of terms are used to describe the material that is referred to in this specification as an anionic clay. Hydrotalcite-like and layered double hydroxide are interchangeably used by those skilled in the art. In this specification we refer to these materials as anionic clays, comprising within that term hydrotalcite-like and layered double hydroxide materials.

Anionic clays in which iron is the divalent metal or at least one of the divalent metals present in the anionic clay structure (according to group 1a) include $Al^{3+}$—$Fe^{2+}$ anionic clay, $B^{3+}$—$Fe^{2+}$ anionic clay, $Ga^{3+}$—$Fe^{2+}$ anionic clay, $In^{3+}$—$Fe^{2+}$ anionic clay, $Bi^{3+}$—$Fe^{2+}$ anionic clay, $Cr^{3+}$—$Fe^{2+}$ anionic clay, $Sc^{3+}$—$Fe^{2+}$ anionic clay, $La^{3+}$—$Fe^{2+}$ anionic clay, $Co^{3+}$—$Fe^{2+}$ anionic clay, $Ce^{3+}$—$Fe^{2+}$ anionic clay, $Al^{3+}$—$Fe^{2+}Mg^{2+}$ anionic clay, $Al^{3+}$—$Fe^{2+}Zn^{2+}$ anionic clay, $Al^{3+}$—$Fe^{2+}Ni^{2+}$ anionic clay, and $Al^{3+}$—$Fe^{2+}Co^{2+}$.

Anionic clays in which iron is the trivalent metal or at least one of the trivalent metals present in the anionic clay structure (according to group 1b) include $Fe^{3+}$—$Mg^{2+}$ anionic clay, $Fe^{3+}$—$Mn^{2+}$ anionic clay, $Fe^{3+}$—$Ca^{2+}$ anionic clay, $Fe^{3+}$—$Ba^{2+}$ anionic clay, $Fe^{3+}$—$Zn^{2+}$ anionic clay, $Fe^{3+}$—$Co^{2+}$ anionic clay, $Fe^{3+}$—$Mo^{2+}$ anionic clay, $Fe^{3+}$—$Ni^{2+}$ anionic clay, $Fe^{3+}$—$Sr^{2+}$ anionic clay, $Fe^{3+}$—$Cu^{2+}$ anionic clay, $Fe^{3+}$—$Zn^{2+}Cu^{2+}$, $Fe^{3+}Al^{3+}$—$Zn^{2+}Cu^{2+}$, $Fe^{3+}$—$Ni^{2+}Cu^{2+}$ anionic clay, $Al^{3+}Fe^{3+}$—$^{Mg2+}$ anionic clay, $Al^{3+}Fe^{3+}$—$Zn^{2+}$ anionic clay, and Ru-doped $Fe^{3+}$—$Zn^{2+}$ anionic clay.

Examples of anionic clays which fall under groups 1a and 1b both include $Fe^{3+}$—$Fe^{2+}$ anionic clay, $Fe^{3+}$—$Fe^{2+}Mg^{2+}$ anionic clay, $Fe^{3+}$—$Fe^{2+}Cu^{2+}$ anionic clay, $Fe^{3+}$—$Fe^{2+}Co^{2+}$ anionic clay, $Fe^{3+}$—$Fe^{2+}Zn^{2+}$ anionic clay, $Al^{3+}Fe^{3+}$—$Fe^{2+}Cu^{2+}$ anionic clay, $Al^{3+}Fe^{3+}$—$Fe^{2+}Co^{2+}$ anionic clay, $Al^{3+}Fe^{3+}$—$Fe^{2+}Zn^{2+}$ anionic clay, $Fe^{3+}$—$Fe^{2+}Cu^{2+}Zn^{2+}$ anionic clay, $Al^{3+}Fe^{3+}$—$Fe^{2+}Cu^{2+}Zn^{2+}$ anionic clay. Examples of iron-doped anionic clays (according to group 2) include iron-doped $Al^{3+}$—$Mg^{2+}$ anionic clay, iron-doped $Al^{3+}$—$Zn^{2+}$ anionic clay, iron-doped $Ga^{3+}$—$Mg^{2+}$ anionic clay, iron-doped $Al^{3+}$—$Ni^{2+}$ anionic clay, iron-doped $Al^{3+}$—$Co^{2+}$ anionic clay, iron-doped $Al^{3+}$—$Cu^{2+}$ anionic clay, iron-doped $Ga^{3+}$—$Mg^{2+}$ anionic clay, iron-doped $Cr^{3+}$—$Mg^{2+}$ anionic clay, iron-doped $La^{3+}$—$Mg^{2+}$ anionic clay, iron-doped $Ce^{3+}$—$Mg^{2+}$ anionic clay, iron-doped $Ga^{3+}$—$Zn^{2+}$ anionic clay, iron-doped $La^{3+}$—$Zn^{2+}$ anionic clay, iron-doped $Ce^{3+}$—$Zn^{2+}$ anionic clay, iron-doped $Fe^{3+}$—$Fe^{2+}$ anionic clay, iron-doped $Fe^{3+}$-$M^{2+}$ anionic clays (e.g. iron-doped $Fe^{3+}$—$Mg^{2+}$ anionic clay), and iron-doped $M^{3+}$—$Fe^{2+}$ anionic clays (e.g. iron-doped $Al^{3+}$—$Fe^{2+}$ anionic clay).

Preparation of Anionic Clays

Iron-containing anionic clays can be prepared by any method known in the art.

For instance, a water-soluble iron(II) salt and a water-soluble trivalent metal salt (e.g. aluminium nitrate) can be co-precipitated from an aqueous solution, followed by aging of the precipitate to form an iron-containing anionic clay according to group 1a. Co-precipitation of a water-soluble iron(III) salt and a water-soluble divalent metal salt (e.g. magnesium nitrate) will result—after aging—in the formation of an iron-containing anionic clay according to group 1b.

It is also possible to age a slurry comprising a divalent iron compound and a trivalent metal compound, at least one of them being water-insoluble (by being in the form of, e.g., an oxide, hydroxide, carbonate, hydroxy carbonate, or oxyhydroxide) to form an iron-containing anionic clay according to group 1a. Likewise, aging of a slurry comprising a trivalent iron compound and a divalent metal compound, at least one of them being water-insoluble, will result in an iron-containing anionic clay according to group 1b.

Iron-doped anionic clays according to group 2 can be prepared by impregnating an already formed anionic clay with an iron-containing compound, or by preparing an anionic clay in the presence of an iron-containing compound. In the latter case, an iron-containing compound can be added to a slurry comprising a divalent and a trivalent metal compound which—after aging—form an anionic clay. It is also possible to prepare an iron-doped anionic clay by aging a slurry comprising a divalent and a trivalent source, at least one of these sources being doped with an iron-containing compound.

If in the above methods for the preparation of iron-containing anionic clays according to groups 1 and 2 an excess of divalent and/or trivalent metal source is used, compositions of iron-containing anionic clay and unreacted (meaning: not reacted to anionic clay) divalent and/or trivalent metal source—e.g. brucite, MgO, boehmite, iron (hydr)oxide and/or zinc (hydr)oxide—may be formed.

The iron-containing anionic clays according to groups 1 and 2 can be thermally treated to form a solid solution, followed by rehydration to form an anionic clay again. This results in an increase in the physical strength of the particles. This thermal treatment and rehydration can also be applied to anionic clays before they are impregnated with an iron-containing compound to form an iron-doped anionic clay according to group 2.

Iron-containing anionic clays may be subjected to ion-exchange. Upon ion-exchange the interlayer charge-balancing anions are replaced with other anions. Examples of suitable anions are carbonate, bicarbonate, nitrate, chloride, sulphate, bisulphate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$ $HBO_4^{2-}$, $HGaO_3^{2-}$, $CrO_4^{2-}$, and Keggin-ions, formate, acetate, and mixtures thereof.

Such an ion-exchange may also be applied to anionic clays before they are impregnated with iron-containing compound to form an iron-doped anionic clay according to group 2.

Calcined iron-doped anionic clays according to group 3 are prepared by calcining an iron-doped anionic clay according to group 2, generally at temperatures in the range 200–1200° C. under oxygen-containing or inert (e.g. $N_2$, Ar, He) atmosphere.

Calcined anionic clays according to group 4 are prepared by calcining an iron-containing anionic clay according to group 1a, generally at temperatures in the range 200–1200° C. under oxygen-containing or inert (e.g. $N_2$, Ar, He) atmosphere.

Layered Hydroxy Salts

Metal hydroxy salts (LHS) are distinguished from anionic clays in that they are built up of divalent metals only, whereas layered double hydroxides are built up of both a divalent and a trivalent metal.

An example of a LHS is a hydroxy salt of a divalent metal according to the following idealised formula: $[(Me^{2+},M^{2+})_2(OH)_3]^+(X^{n-})_{1/n}$ wherein $Me^{2+}$ and $M^{2+}$ can be the same or different divalent metal ions and X is an anion other than $OH^-$. Another example of LHS has the general formula $[(Me^{2+},M^{2+})_5(OH)_8]^{2+}(X^{n-})_{2/n}$ wherein $Me^{2+}$ and $M^{2+}$ can be the same or different divalent metal ions and X is an anion other than $OH^-$.

If the LHS contains two different metals, the ratio of the relative amounts of the two metals may be close to 1. Alternatively, this ratio may be much higher, meaning that one of the metals predominates over the other. It is important to appreciate that these formulae are ideal and that in practice the overall structure will be maintained although chemical analysis may indicate compositions not satisfying the ideal formula.

The LHS-structures described above may be considered an alternating sequence of modified brucite-like layers in which the divalent metal(s) is/are coordinated octrahedrally with hydroxide ions. In one family, structural hydroxyl groups are partially replaced by other anions (e.g. nitrate) that may be exchanged. In another family, vacancies in the octahedral layers are accompanied by tetrahedrically coordinated cations.

For further structural details as well as work on layered hydroxy salts the following publications are referenced:
*J. Solid State Chem.* 148 (1999) 26–40
*Recent Res. Devel. In Mat. Sci.* 1 (1998) 137–188
*Solid State Ionics* 53–56 (1992) 527–533
*Inorg. Chem.* 32 (1993) 1209–1215
*J. Mater. Chem.* 1 (1991) 531–537
*Russian J Inorganic Chemistry,* 30, (1985) 1718–1720
*Reactivity of Solids,* 1, (1986) 319–327
*Reactivity of Solids,* 3, (1987) 67–74
*Compt. Rend.* 248, (1959) 3170–3172

Layered hydroxy salts in which iron is a divalent metal (according to group 1a) include Fe-LHS, Fe—Co LHS, Zn—Fe LHS, Fe—Co LHS, Zn—Fe—Co LHS, Mg—Fe—Co LHS, and Zn—Cu—Fe LHS. It will be clear from their definition that layered hydroxy salts according to group 1b do not exist.

Examples of iron-doped layered hydroxy salts (according to group 2) include iron-doped Zn-LHS (e.g. $Zn_5(OH)_8(X)_2$, $Zn_4(OH)_6X$), iron-doped Cu-LHS (e.g. $Cu_2(OH)_3X$, $Cu_4(OH)_6X$, $Cu_7(OH)12(X)_2$), iron-doped Co-LHS (e.g. $Co_2(OH)_3X$, iron-doped Ni-LHS (e.g. $Ni_2(OH)_3X$), iron-doped Mg-LHS (e.g. $Mg_2(OH)_3X$), iron-doped Mn-LHS, iron-doped Zn—Cu LHS, iron-doped Zn—Ni LHS, iron-doped Zn—Co LHS, iron-doped Zn—Mn LHS, iron-doped Ni—Cu LHS, iron-doped Cu—Co LHS, iron-doped Cu—Mg LHS, iron-doped Cu—Mn LHS, iron-doped Ni—Co LHS, iron-doped Ni—Cu—Co LHS, iron-doped Fe-LHS, iron-doped Fe—Co LHS, iron-doped Zn—Fe LHS, iron-doped Fe—Co LHS, iron-doped Zn—Fe—Co LHS, iron-doped Mg—Fe—Co LHS, and iron-doped Zn—Cu—Fe LHS.

The iron-containing LHS may contain additives other than iron, such as rare earth metals (e.g. Ce, La), Al, Si, P, B, group VI, group VIII, alkaline earth (for instance Ca and Ba) and/or transition metals (for example Mn, Ti, Zr, Cu, Ru, Co, Ni, Zn, Mo, V, W, Sn). The use of Al as additive is advantageous for creating porosity in the LHS structure. La, B, Si, and Mg can improve the sinter resistance of the LHS.

Examples of iron-containing LHS containing additives other than iron include Fe-LHS doped with 4–6 wt % Zn (calculated as ZnO) and Fe-LHS doped with 2–3 wt % Zn (calculated as ZnO) and 3–4 wt % Cu (calculated as CuO).

Examples of suitable interlayer anions $X^{n-}$ are the inorganic anions $NO_3^-$, $NO_2^-$, $CO_3^{2-}$, $HCO_2^-$, $SO_4^{2-}$, $SO_3NH_2^-$, $P_2O_7^{2-}$, $MnO_4^-$, $SCN^-$, $S_2O_6^{2-}$, $Si_8O_{20}^{8-}$, $SeO_4^-$, $F^-$, $Cl^-$, $Br^-$, $I^-$, $ClO_3^-$, $ClO_4^-$, $BrO_3^-$, and $IO_3^-$ and the organic anions acetate, long chain carboxylates (e.g. sebacate, caprate and caprylate (CPL)), alkylsulfates (e.g. dodecylsulfate (DS) and dodecylbenzenesulfate), benzoate, and phthalocyanine tetrasulfonate. Exchange of these ions has been fully documented in the literature. By controlling the exchange conditions mixed inorganic/organic compositions can be obtained e.g. $Cu_2(OH)_3(NO_3)(CPL)_{0.2}(DS)_{0.5} \cdot (H_2O)_{0.1}$.

LHS exhanged with (bi)carbonates or organic anions provides the advantage that upon calcination, the anion will decompose, thereby increasing the porosity and surface area of the LHS Preparation of Layered Hydroxy Salts Suitable methods for the preparation of layered hydroxy salts involve the reaction of a metal oxide with a dissolved metal salt (see *Inorg. Chem.* 32 (1993) 1209–1215) and (co-)precipitation from metal salt solutions (see *J. Solid State Chem.* 148 (1999) 26–40 and *J. Mater. Chem.* 1 (1991) 531–537). After preparation of the LHS, the interlayer anions may be exchanged, if so desired, by a regular ion-exchange procedure.

Thus, according to these methods, iron-containing LHS according to group 1a can be prepared by reacting (i) an iron oxide with a dissolved divalent metal salt (either a Fe(II) salt or another divalent metal salt), (ii) a Fe(II) salt with a divalent metal oxide, or (iii) by co-precipitating a Fe(II) salt with another divalent metal salt.

Iron-doped LHS according to group 2 can be prepared by impregnating an existing LHS, reacting a divalent metal salt with another divalent metal salt or divalent metal oxide in the presence of an iron compound, or by using an iron-doped divalent metal oxide for the preparation of a LHS.

Calcined iron-doped layered hydroxy salts according to group 3 are prepared by calcining an iron-doped layered hydroxy salts according to group 2, generally at temperatures in the range 200–1200° C. under oxygen-containing or inert (e.g. $N_2$, Ar, He) atmosphere.

Calcined layered hydroxy salts according to group 4 are prepared by calcining an iron-containing layered hydroxy salt according to group 1a, generally at temperatures in the range 200–1200° C. under oxygen-containing or inert (e.g. $N_2$, Ar, He) atmosphere.

Cationic Clays

Cationic clays differ from anionic clays in that they have a crystal structure consisting of negatively charged layers built up of specific combinations of tetravalent, trivalent, and optionally divalent metal hydroxides between which there are cations and water molecules. Suitable iron-containing cationic clays for use in the present invention include natural and synthetic iron-containing cationic clays.

Iron-containing cationic clays according to group 1 include iron-containing smectites, iron-containing illites, iron-containing micas, iron-containing glauconites, iron-containing attapulgite, etc.

Iron-doped cationic clays (according to group 2) are generally prepared by exchanging a cationic clay with $Fe^{2+}$, $Fe^{3+}$, or cationic iron-containing complexes. Alternatively, they are impregnated with an iron compound, or the iron compound is present during preparation of the cationic clay.

Examples of suitable cationic clays to be impregnated or ion-exchanged with an iron-containing compound are smectites (including montmorillonite, beidellite, nontronite, hectorite, saponite, laponite™, and sauconite), bentonite, illites, micas, glauconite, vermiculites, attapulgite, and sepiolite.

Calcined iron-doped cationic clays according to group 3 are prepared by calcining an iron-doped cationic clay according to group 2, generally at temperatures in the range 200–1200° C. under oxygen-containing or inert (e.g. $N_2$, Ar, He) atmosphere.

Calcined cationic clays according to group 4 are prepared by calcining an iron-containing cationic clay according to group 1a, generally at temperatures in the range 200–1200° C. under oxygen-containing or inert (e.g. $N_2$, Ar, He) atmosphere.

Cationic Layered Materials

Cationic Layered Materials (CLMs) are crystalline $NH_4$-Me(II)-TM-O phases with a characteristic X-ray diffraction pattern. In this structure, Me(II) represents a divalent metal and TM stands for a transition metal. The structure of a CLM consists of negatively charged layers of divalent metal octrahedra and transition metal tetrahedra with charge-compensating cations sandwiched between these layers.

Iron-containing CLMs according to group 1 have Fe(II) as the divalent metal. Hence, they belong to group 1a. One of the methods by which they can be prepared is the one according to M. P. Astier et al. (*Ann. Chim. Fr.* Vol. 12, 1987, pp. 337–343), which involves the reaction of an ammonium transition metal salt (e.g. ammonium heptamolybdate) and a Fe(II) salt in aqueous ammonia solution. Upon evaporation of ammonia a precipitate is formed, which is then aged to form a CLM.

Another method is that according to D. Levin, S. Soled, and J. Ying (*Chem. Mater.* Vol. 8, 1996, 836–843; *ACS Symp. Ser.* Vol. 622, 1996, 237–249; *Stud. Surf, Sci. Catal.* Vol. 118, 1998, 359–367). This method involves the steps of (a) precipitating a Fe(II) salt and aluminium nitrate, (b) aging the precipitate to form an anionic clay, (c) calcining the anionic clay to form a mixed oxide, and (d) contacting and reacting the mixed oxide with ammonium transition metal salts (e.g. ammonium heptamolybdate) to form a CLM.

A third method is that according to non-prepublished patent application no. PT/EP03/06646, which involves the steps of (a) preparing a slurry comprising a water-insoluble aluminium source and a Fe(II) source, (b) drying the slurry of step a) and calcining the dried material to form a first calcined material, (c) optionally rehydrating the product of step b) to obtain an anionic clay, followed by calcining the anionic clay to form a second calcined material, (d) contacting a slurry of either the first or the second calcined material with an ammonium transition metal salt, and (e) aging the resulting slurry.

Iron-doped CLMs according to group 2 can be prepared by impregnating a CLM with an iron-containing compound or by preparing the CLM in the presence of an iron-containing compound.

Other additives can be present in or on the CLM. Such additives include compounds of rare earth metals (e.g. Ce, La), Si, P, B, group VI metals, group VIII metals, alkaline earth (for instance Ca, Mg, and Ba) and/or transition metals (for example Mn, Ti, Zr, Cu, Ru, Co, Ni, Zn, Mo, V, W, Sn).

Calcined iron-doped CLMs according to group 3 are prepared by calcining an iron-doped CLM according to group 2, generally at temperatures in the range 200–1200° C. under oxygen-containing or inert (e.g. $N_2$, Ar, He) atmosphere.

Calcined CLMs according to group 4 are prepared by calcining an iron-containing CLM according to group 1a, generally at temperatures in the range 200–1200° C. under oxygen-containing or inert (e.g. $N_2$, Ar, He) atmosphere.

Catalyst Compositions

The Fischer-Tropsch catalyst precursor used in the process according to the invention can consist solely of one or more iron-containing layered material(s). However, it can be advantageous to have other catalyst components present, such as iron-free anionic clays, e.g. Al—Mg anionic clay, magnesium (hydr)oxide, iron hydroxide, e.g. $Fe(OH)_3$ or FeOOH, iron oxide, alumina, titania, silica, and/or zinc (hydr)oxide.

Furthermore, it is possible to add additives to the Fischer-Tropsch catalyst precursor, either by having one or more additives present during preparation of the iron-containing layered material, or by impregnating the iron-containing layered material with one or more additives. Suitable additives are compounds of rare earth metals (e.g. Ce, La), Si, P, B, group VI metals, group VIII noble metals (Pt, Pd), alkaline earth (for instance Ca, Mg, and Ba), alkaline metals (e.g. K) and/or transition metals (for example Mn, Ti, Zr, Cu, Ru, Co, Ni, Zn, Mo, V, W, Sn, Cr, Re, Rh).

The Fischer-Tropsch Synthesis

Before use in the Fischer-Tropsch synthesis, the Fischer-Tropsch catalyst precursor may be reduced—according to step b) of the method according to the invention—to form the Fischer-Tropsch catalyst. This reduction can be performed either in situ or ex situ and preferably in a hydrogen-containing atmosphere at temperatures in the range 200–600° C.

If no reduction step is performed, the final Fischer-Tropsch catalyst will be formed from the Fischer-Tropsch catalyst precursor during Fischer-Tropsch synthesis.

The Fischer-Tropsch synthesis—according to step c) of the method according to the invention—can be conducted in any manner known in the art for performing this reaction over iron-containing catalysts. Typically, it is conducted at temperatures between 200 and 400° C. and pressures between about 1 and 70 atm, preferably 1–30 atm, in a slurry reactor, a fixed bed reactor, or a fluidized bed reactor. Typical $H_2/CO$ ratios range from 0.5 to 6.0, more preferably 0.5–2.0.

EXAMPLES

Example 1

An aqueous solution of $Fe(NO_3)_3.9H_2O$ (0.17 mol) and $Mg(NO_3)_2.6H_2O$ (0.51 mol) was added slowly to an aqueous solution of KOH and $K_2CO_3$. After two hours of stirring, the solution was brought to pH=9.5. The precipitate was aged for 16 hours at 70° C. and subsequently isolated, washed with de-ionized water, and dried at 85° C. XRD and chemical analysis revealed the quantitative formation of a $Fe^{3+}$—$Mg^{2+}$ anionic clay according to group 1b.

Example 2

An aqueous solution of $Mg(NO_3)_2.6H_2O$ (0.24 mol), $Al(NO_3)_3.9H_2O$ (0.10 mol), and $FeSO_4.7H_2O$ (0.06 mol) was added slowly to 200 mL de-ionized water under $N_2$-atmosphere. Simultaneously, an aqueous solution of $Na_2CO_3$ (1M) was added. During the addition of the two aqueous solutions, the reaction medium was kept at 40° C. and pH=8.5. The resulting precipitate was aged for 24 hours at 40° C. under stirring. The product was washed with de-ionized water and dried at 85° C. XRD and chemical analysis revealed the quantitative formation of an $Al^{3+}$—$Mg^{2+}$—$Fe^{2+}$ anionic clay according to group 1a.

Example 3

The product of Example 2 was calcined in air at 350° C. for 5 hours to obtain a calcined Fe-containing anionic clay according to group 4.

Example 4

An aqueous solution of $Fe(NO_3)_3$ (0.25 mol) in de-ionized water was added slowly to a suspension of MgO (0.53 mol) and $Mg(OH)_x(CO_3)_y$ (0.23 mol) in de-ionized water. The reaction mixture was brought to pH=9.5 and subsequently stirred at 80° C. for 16 hours. The precipitate was isolated by filtration, washed with de-ionized water, and dried at 85° C. XRD and chemical analysis revealed the quantitative formation of a $Fe^{3+}$—$Mg^{2+}$ anionic clay according to group 1b.

Example 5

A suspension of $Fe(OH)_3$ (0.25 mol) in de-ionized water was added to a suspension of MgO (0.53 mol) and $Mg(OH)_x(CO_3)_y$ (0.23 mol) in de-ionized water. The reaction mixture was aged at 80° C. for 24 hours under stirring. The precipitate was isolated by filtration and dried at 85° C. XRD and chemical analysis revealed the quantitative formation of a $Fe^{3+}$—$Mg^{2+}$ anionic clay according to group 1b.

Example 6

A suspension of $Fe(OH)_3$ (0.25 mol) in de-ionized water was added to a suspension of MgO (0.53 mol) and $Mg(OH)_x(CO_3)_y$ (0.23 mol) in de-ionized water. The reaction mixture was aged at 140° C. under hydrothermal conditions for 24 hours under stirring. The precipitate was isolated by filtration and dried at 85° C. XRD revealed the formation of a $Fe^{3+}$—$Mg^{2+}$ anionic clay according to group 1b.

Example 7

An aqueous solution of $Fe(NO_3)_3.9H_2O$ (1 mol) and $Zn(NO_3)_2.6H_2O$ (3 mol) was added slowly to an aqueous solution of $(NH_4)_2CO_3$. The pH of the solution was kept at 7 by introducing NaOH. The precipitate was aged for 1 hour at room temperature and subsequently isolated, washed with de-ionized water, and dried at 120° C. XRD and chemical analysis revealed the quantitative formation of a $Fe^{3+}$—$Zn^{2+}$ anionic clay according to group 1b.

Example 8

An aqueous solution of $Fe(NO_3)_3.9H_2O$ (1 mol) and $Co(NO_3)_2.6H_2O$ (3 mol) was added slowly to an aqueous solution of $Na_2CO_3$ at 65° C. The pH of the solution was kept at 10 by introducing NaOH. The precipitate was aged for 1 hour at 65° C. and subsequently isolated, washed with de-ionized water, and dried at 120° C. XRD and chemical analysis revealed the quantitative formation of a $Fe^{3+}$—$Co^{2+}$ anionic clay according to group 1b.

Example 9

In a 10-litre autoclave MgO (ex Nedmag®) and Bauxite Ore Concentrate (BOC) were slurried in water in a ratio of 4 to 1. The slurry was milled and hydrothermally treated at 170° C. for 90 minutes. The XRD pattern of the product—after drying at 120° C.—showed the presence of $3R_2$-type anionic clay according to WO 01/12550.

The anionic clay was impregnated with an aqueous solution of $Fe(NO_3)_3.9H_2O$ using an appropriate liquid volume for incipient wetness impregnation (c 0.6–0.8 mL/g) and an iron concentration leading to an iron loading of 10 wt % (calculated as $Fe_2O_3$ and based on total weight of doped anionic clay). The impregnated anionic clay was dried in air at 120° C. for three hours, resulting in an anionic clay doped with 10 wt % Fe (calculated as $Fe_2O_3$ and based on the total weight of the doped anionic clay) according to group 2.

Example 10

The product of Example 9 was calcined in air at 350° C. for 5 hours to obtain a calcined Fe-doped anionic clay according to group 3.

Example 11

The iron-containing anionic clays according to Examples 1–10 were tested for their Fischer-Tropsch activity, selectivity, and stability in a fixed bed reactor at atmospheric pressure using two different tests.

For comparison, the same tests were applied to two types of reference materials: (i) "state of the art" iron oxide catalysts (prepared by a precipitation reaction between iron salts and a base) and (ii) a mixed metal oxide containing both magnesium oxide and iron oxide (atomic ratio Mg:Fe= 3:1) prepared by co-precipitation of a mixture of magnesium salts and iron salts with a base.

The first test involved pulse-testing of an accurately defined amount of CO in a flow of $H_2$ during a well-defined time-span, applying the apparatus described in International Patent Application No. WO 01/79835, page 7, line 24 through page 8, line 3 for pulse-chemisorption.

A catalyst sample (200 mg) was first reduced under flowing $H_2$ (total flow 20 mL/min) while increasing the temperature from room temperature to 400° C. with a ramp of 10° C./min. The sample was subsequently kept at 400° C. for 4 hours under $H_2$-flow (total flow 20 mL/min). Next, the sample was allowed to cool down to room temperature while flowing He. CO pulse-testing was performed at room temperature and measured with a TCD (total flow He=16 mL/min, 8 µL CO per pulse). Then, the samples were treated by flowing $H_2$ (total flow 20 mL/min) and increasing the temperature from room temperature to 400° C. with a ramp of 10° C./min. The samples were kept at 400° C. for 30 minutes under flowing $H_2$ (total flow 20 mL/min) and subsequently allowed to cool down to 250° C. in $H_2$-atmosphere. The Fischer-Tropsch activity was measured by measuring the response of small CO pulses in a $H_2$-flow (total $H_2$ flow=20 mL/min, 8 µL CO per pulse) at 250° C. using a FID. After stripping the surface of the samples with $H_2$, this activity test was repeated.

The second test was conducted in a micro-flow apparatus. The samples were diluted with SiC, placed the reactor tube, and pre-treated in a mixture of 10 vol. % $H_2$ in He (total flow 100 mL/min) at a temperature increasing from room temperature to 400° C. at a rate of 1° C./min. This temperature was maintained for 9 hours. Prior to the start of the reaction the samples were cooled to 300° C. The reactor feed consisted of a flow of 30 mL/min of a mixture of $H_2$ and CO ($H_2$/CO ratio=2). The hydrocarbons in the effluent were measured online by a GC-17 Shimadzu gas chromatograph ($Al_2O_3$/KCl), while CO and $CO_2$ were measured offline on a Varian gas chromatograph (Poraplot U/Molsieve 5A).

Activity

The first test showed that the Fischer-Tropsch activity—per gram of iron—of the samples according to Examples 1–10 was a factor 2–6 larger than that of the most active iron oxide reference material. The activity of the mixed oxide reference material was even lower than that of the iron oxide reference materials.

The second test showed that—at 2 hours running time—the Fischer-Tropsch activity—per gram of iron—of the samples according to Examples 1–10 was a factor 10–30 larger than that of the most active iron oxide reference material. The activity of the mixed oxide reference material was even lower than that of the iron oxide reference materials.

It was also found that the activity of the product of Example 3 was somewhat higher than that of its uncalcined version of Example 2.

Stability

Furthermore, the activity of the samples according to Examples 1–10 was stable from 1 hour (steady-state) to 6 hours running time, while the activity of the iron oxide reference materials gradually decreased by a factor 2–3 in this time period.

Selectivity

Except for the sample according to Example 7, all iron-containing anionic clays showed a lower selectivity towards methane than the iron oxide and the mixed oxide reference materials. Furthermore, the selectivity towards methane of the iron oxide reference materials increased by a factor 1.4–1.7 during the test run, while for the iron-containing anionic clays the selectivity towards methane remained constant.

What is claimed is:

1. A method for performing a Fischer-Tropsch process comprising the steps of:
   a. selecting a Fischer-Tropsch catalyst precursor,
   b. optionally reducing the Fischer-Tropsch catalyst precursor to form a Fischer-Tropsch catalyst, and
   c. performing a Fischer-Tropsch synthesis using the Fischer-Tropsch catalyst precursor according to step a) or the Fischer-Tropsch catalyst according to step b), wherein the Fischer-Tropsch catalyst precursor comprises an iron-containing layered material selected from the group consisting of layered materials in which iron is present in the layered structure as divalent metal, iron-doped layered materials, calcined iron-doped layered materials, and calcined layered materials in which iron is present in the layered structure as divalent metal said layered material being selected from the group consisting of anionic clays, layered hydroxy salts, and cationic layered materials with a crystalline $NH_4$—Me(II)-TM-O phase wherein Me(II) is a divalent metal and TM a transition metal.

2. The method for performing a Fischer-Tropsch process of claim 1 wherein the iron-doped layered material contains 1–35 wt % of iron calculated as $Fe_2O_3$ and based on the weight of the iron-doped layered material.

3. A method for performing a Fischer-Tropsch process comprising the steps of:
   a. selecting a Fischer-Tropsch catalyst precursor,
   b. optionally reducing the Fischer-Tropsch catalyst precursor to form a Fischer-Tropsch catalyst, and
   c. performing a Fischer-Tropsch synthesis using the Fischer-Tropsch catalyst precursor according to step a) or the Fischer-Tropsch catalyst according to step b), wherein the Fischer-Tropsch catalyst precursor comprises an anionic clay in which iron is present in the layered structure as trivalent metal.

* * * * *